UNITED STATES PATENT OFFICE.

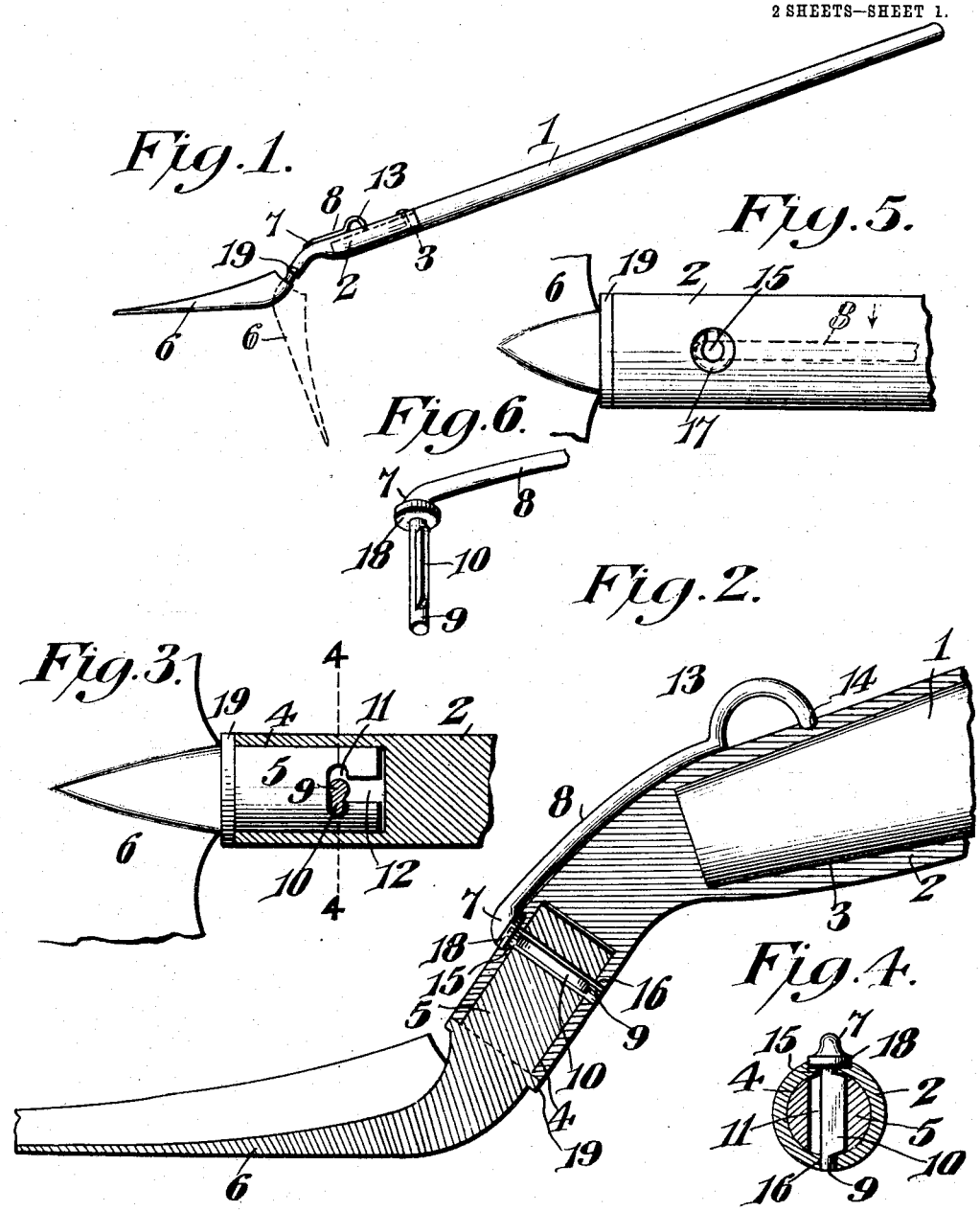

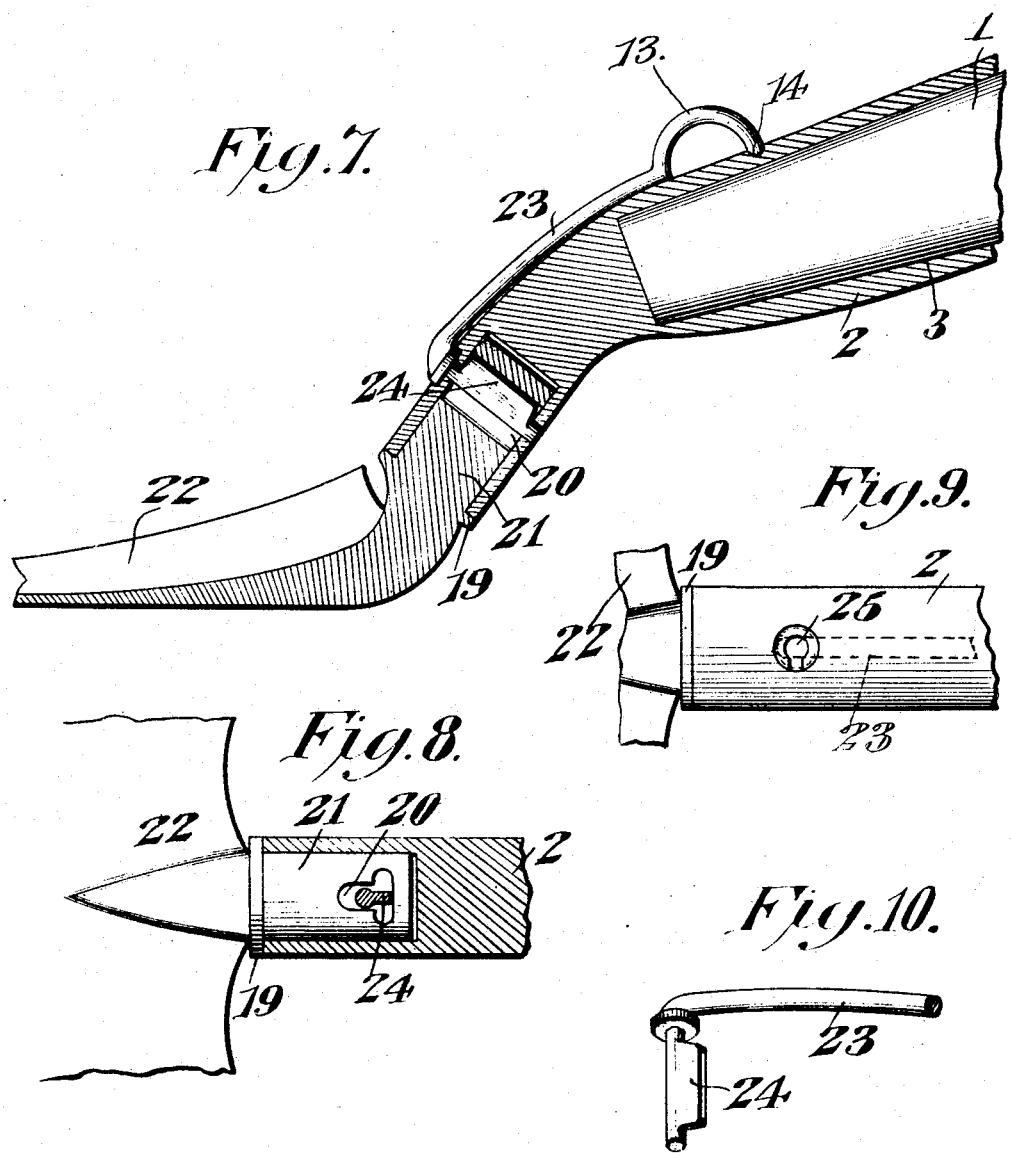

DERRICK BARNARD HARTWELL, OF ROSEWORTH, IDAHO.

COMBINED SHOVEL AND HOE.

939,019.  Specification of Letters Patent.  Patented Nov. 2, 1909.

Application filed April 13, 1909. Serial No. 489,553.

*To all whom it may concern:*

Be it known that I, DERRICK B. HARTWELL, a citizen of the United States, residing at Roseworth, in the county of Twin Falls and State of Idaho, have invented a new and useful Combined Shovel and Hoe, of which the following is a specification.

The invention relates to a combined shovel and hoe.

The object of the present invention is to provide a simple, inexpensive and efficient combined shovel and hoe, adapted to permit a single blade to be quickly arranged in position at the outer end of the handle to form either a shovel or a hoe.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a combined shovel and hoe, constructed in accordance with this invention, illustrating in full lines the arrangement of the blade to form a shovel and showing in dotted lines the position occupied by the blade to form a hoe. Fig. 2 is a longitudinal sectional view of the same. Fig. 3 is a detail sectional view, illustrating the construction for detachably locking the shank of the blade in the socket piece of the handle. Fig. 4 is a transverse sectional view on the line 4—4 of Fig. 3. Fig. 5 is an enlarged plan view of a portion of the combined shovel and hoe, the lever being shown in dotted lines. Fig. 6 is a detail perspective view of the locking lever. Fig. 7 is a central longitudinal sectional view, illustrating a modification of the invention, in which the locking lever is detachable for releasing the shank of the blade. Fig. 8 is a detail sectional view, illustrating the arrangement of the engaging portion of the locking lever when arranged for securing the shank of the blade within the socket piece. Fig. 9 is a detail view of a portion of the blade and the socket piece, the locking lever being shown in dotted lines. Fig. 10 is a detail perspective view of the locking lever.

Like numerals of reference designate corresponding parts in all the figures of the drawings.

1 designates a straight handle, equipped at its outer end with a socket piece 2, constructed of suitable metal and provided at its inner and outer ends with sockets, the inner socket 3 receiving the adjacent end of the handle 1, and the outer socket 4 being reduced for the reception of a shank 5 of a shovel blade 6. The outer reduced socket portion of the socket piece is arranged at an obtuse angle to the inner portion, and the shank 5 of the shovel blade is also arranged at an obtuse angle to the said blade, so that when it is fitted in the socket piece, as illustrated in full lines in Fig. 1 of the drawings, the shovel blade will extend in substantially the same direction as the handle to form a shovel, and when it is reversed to the position illustrated in dotted lines in Fig. 1, it will be arranged approximately at right angles to the handle to form a hoe. By this arrangement it is only necessary to reverse the blade to change it from one position to the other, and only a single outer shank-receiving socket is employed for these adjustments of the blade.

The shank conforms to the interior configuration of the outer socket, and these parts may be either of circular or semi-circular form and the shank is secured in the socket by means of a locking lever 7. The locking lever consists of an operating arm 8 and a pivot 9, provided with a longitudinal flange 10, adapted to be turned into and out of engagement with the shank. The locking lever 7 is adapted to release the shank without being removed from the socket piece, and for this purpose the shank is provided with a substantially T-shaped opening, consisting of a transverse portion 11 and a longitudinal branch or portion 12. The flange 10 of the locking lever is arranged approximately at right angles to the operating arm 8, and when the operating arm of the lever is arranged longitudinally of the socket piece, the flange 10 extends into the transverse portion of the T-shaped opening, as clearly illustrated in Fig. 3 of the drawings. To release the shank of the blade, the operating arm of the locking lever is swung in the direction of the arrow in Fig. 5 of the drawings from its position longitudinally of the handle to a position at right angles to the same. The quarter turn or rotation of the pivot carries the flange outward with respect to the socket piece and arranges the flanges in alinement with the entrance portion 12 of the T-shaped opening. This releases the shank, which may be withdrawn from engagement with the locking lever. The shank may then be partially rotated to arrange the blade in either position with respect to the handle so as to form either a shovel or hoe.

The operating arm 8 of the locking lever is resilient and is provided at its free end with a substantially semi-circular bend 13, extending inwardly toward the handle when the operating arm is in alinement with the same and having a terminal arranged to engage a perforation 14 of the socket piece, whereby the operating arm is locked in engagement with the socket piece. The resiliency of the operating arm enables the latter to be readily sprung into and out of engagement with the perforation, and the spring of the metal also serves to hold the shank of the blade tightly in engagement with the handle. Should the parts become worn too much for the resiliency of the metal to counteract, the lever may be heated and re-shaped to change the position of the flange with respect to the operating arm, or a new locking lever may be substituted for the worn one.

The pivot is journaled in upper and lower openings 15 and 16 of the socket piece. The lower opening 16 is circular and the upper opening consists of a key hole slot, the metal being recessed around the key hole slot at the exterior of the socket piece to form a seat 17 for the reception of a head 18 of the pivot. The head, which consists of a disk, fits in the recess 17, which is circular. The flange 10, which projects beyond the pivot 9, engages the interior of the socket piece and the head, which engages the socket piece exteriorly, forms a bearing for the locking lever. The key hole slot or opening 15 permits the removal of the locking lever when the same is swung to the opposite side of the socket piece, and the movement of the lever in locking the shank draws the shoulder 19 thereof firmly against the end of the socket piece.

In Figs. 7 to 10 inclusive is illustrated a modification of the invention in which the T-shaped opening 20 of the shank 21 of the shovel blade 22 does not extend to the end of the shank and is closed thereat. The T-shaped opening 20 is reversed with relation to the T-shaped opening of the shank 5, the transverse portion being located at the end of the longitudinal branch at the end opposite that occupied by the transverse portion 11. The locking lever 23, which is constructed substantially the same as the lever 7 with the exception of the arrangement of the flange 24, is removable, being detached from the socket piece before the adjustment or reversal of the blade is being replaced after the blade has been reversed. The flange 24 is arranged in alinement with the operating arm of the locking lever, and it engages the wall of the transverse portion of the shank, as illustrated in Fig. 8 when the parts are locked. The lever 23 is swung in the same direction as the lever 7 to release the shank, and the key hole opening 25 of the socket piece is arranged the reverse of the key hole opening 15, the contracted portion extending from the circular portion, as shown in Fig. 9, so that when the operating arm is swung around to a position at right angles to the socket piece, the lever may be removed.

With either form of the invention the blade may be quickly changed from one position to the other and is securely locked in either position.

Having thus fully described my invention, what I claim as new and desire to secure by Letters Patent, is:—

1. A combined shovel and hoe including a socket piece provided at its outer portion with a socket arranged at an obtuse angle to the inner portion, a blade having a shank arranged at an obtuse angle to it and fitted in the socket and adapted to be reversed, whereby the blade is adapted to extend from the handle in a longitudinal direction or at substantially right angles to the said handle, and a locking device journaled in the socket and passing through the shank to lock the latter in the socket.

2. A combined shovel and hoe including a handle, a socket piece having an enlarged inner socket portion receiving the handle, said socket piece being also provided with a reduced outer portion forming a socket and arranged at an obtuse angle to the socket, a blade having a shank arranged at an obtuse angle to it and fitted in the outer socket and reversible to arrange the blade either longitudinally of the handle or substantially at right angles thereto, and a locking device journaled in the socket and passing through the shank to lock the latter in the socket.

3. A device of the class described including a socket piece having a key hole opening, a reversible shank fitted in the socket and provided with a substantially T-shaped opening, and a locking lever having a pivot provided with a flange and adapted to be passed through the key hole opening of the socket and operable in the opening of the shank.

4. A device of the class described including a socket piece having a key hole opening, a reversible shank fitted in the socket and provided with a substantially T-shaped opening, and a locking lever consisting of a pivot provided with a flange and adapted to extend through the key hole opening of the socket piece and operable in the slot of the shank, and an operating arm engaging the socket piece and locking the pivot against rotation.

5. A device of the class described including a socket piece having a key hole opening, a reversible shank fitted in the socket and provided with a substantially T-shaped opening, and a locking lever consisting of an operating arm, and a pivot provided with a flange and adapted to extend through the key hole opening of the socket piece and operable in the slot of the shank, said operating arm being resilient and detachably engaging the socket piece for holding the flange in engagement with the shank.

6. A device of the class described including a socket piece, a blade provided with a shank detachably fitted in the socket piece and having an opening consisting of a transverse portion, and a longitudinal portion extending from the transverse portion to the end of the shank, and a locking lever provided with a pivot having a flange operating within the socket piece and engaging the opening of the shank.

7. A device of the class described including a socket piece having a key hole opening, a shank detachably fitted in the socket piece and provided with a substantially T-shaped opening having a longitudinal portion extending to the end of the shank, and a locking lever composed of an operating arm, a pivot provided with a flange arranged at right angles to the operating arm, and means for securing the operating arm in alinement with the socket piece.

8. A device of the class described including a socket piece provided with a key hole opening and having an exterior recess thereat, a blade having a shank fitted in the socket piece and provided with an opening composed of a longitudinal portion and a transverse portion, and a locking lever having an operating arm and provided with a pivot having a flange and adapted to pass through the key hole opening of the socket piece and operable in the opening of the shank.

9. A device of the class described including a socket piece having a perforation, a blade having a shank fitted in the socket piece and provided with an opening composed of a transverse portion and a longitudinal portion, and a locking lever provided with an operating arm and having a pivot provided with a flange and operating in the slot of the shank, said operating arm being resilient and provided with a pin engaging the perforation of the socket piece.

In testimony that I claim the foregoing as my own, I have hereto affixed my signature in the presence of two witnesses.

D. BARNARD HARTWELL.

Witnesses:
ROBERT ROGERSON,
R. H. ROYS.